US011879064B2

(12) United States Patent
Yamada et al.

(10) Patent No.: US 11,879,064 B2
(45) Date of Patent: Jan. 23, 2024

(54) CONDENSED POLYCYCLIC ORGANIC PIGMENT COMPOSITION CONTAINING POLYVALENT METAL INORGANIC SALT

(71) Applicant: DIC Corporation, Tokyo (JP)

(72) Inventors: Shogo Yamada, Kamisu (JP); Hiromasa Kikuchi, Kamisu (JP); Yukiko Higuchi, Kamisu (JP); Hidehiro Ootake, Kamisu (JP)

(73) Assignee: DIC CORPORATION, Tokyo (JP)

( * ) Notice: Subject to any disclaimer, the term of this patent is extended or adjusted under 35 U.S.C. 154(b) by 822 days.

(21) Appl. No.: 16/962,006

(22) PCT Filed: Jun. 20, 2019

(86) PCT No.: PCT/JP2019/024463
§ 371 (c)(1),
(2) Date: Jul. 14, 2020

(87) PCT Pub. No.: WO2020/031519
PCT Pub. Date: Feb. 13, 2020

(65) Prior Publication Data
US 2021/0071015 A1    Mar. 11, 2021

(30) Foreign Application Priority Data

Aug. 6, 2018    (JP) ................................. 2018-147345

(51) Int. Cl.
| | |
|---|---|
| *C09D 11/037* | (2014.01) |
| *C09B 3/14* | (2006.01) |
| *C09B 47/04* | (2006.01) |
| *C09B 48/00* | (2006.01) |
| *C09D 11/322* | (2014.01) |
| *C09D 17/00* | (2006.01) |

(52) U.S. Cl.
CPC .............. *C09D 11/037* (2013.01); *C09B 3/14* (2013.01); *C09B 47/04* (2013.01); *C09B 48/00* (2013.01); *C09D 11/322* (2013.01); *C09D 17/001* (2013.01); *C09D 17/003* (2013.01)

(58) Field of Classification Search
CPC .. C09D 11/037; C09D 11/322; C09D 17/001; C09D 17/003; C09B 3/14; C09B 47/04; C09B 48/00
See application file for complete search history.

(56) References Cited

U.S. PATENT DOCUMENTS

| | | | | |
|---|---|---|---|---|
| 4,088,506 A | * | 5/1978 | Wetzel | ................ C09B 67/0002 |
| | | | | 546/49 |
| 5,084,100 A | * | 1/1992 | Bauman | .............. C09B 67/0022 |
| | | | | 106/497 |
| 5,472,490 A | | 12/1995 | Sawamura et al. | |
| 5,811,213 A | | 9/1998 | Chiba | |
| 2004/0060478 A1 | | 4/2004 | Weber et al. | |
| 2012/0183894 A1 | | 7/2012 | Matsumoto et al. | |
| 2013/0050364 A1 | | 2/2013 | Imamura et al. | |
| 2015/0247052 A1 | | 9/2015 | Yamashita et al. | |

FOREIGN PATENT DOCUMENTS

| | | | |
|---|---|---|---|
| CN | 105936760 A | 9/2016 | |
| EP | 0 069 895 A2 | 1/1983 | |
| EP | 3 647 374 A1 | 5/2020 | |
| JP | 58-17167 A | 2/1983 | |
| JP | 3-95274 A | 4/1991 | |
| JP | 6-306301 A | 11/1994 | |
| JP | 10-123760 A | 5/1998 | |
| JP | 2003-138161 A | 5/2003 | |
| JP | 2003336001 A * | 11/2003 | ............. C09D 17/00 |
| JP | 2004-531593 A | 10/2004 | |
| JP | 2011-162662 A | 8/2011 | |
| JP | 2012-150163 A | 8/2012 | |
| JP | 2013-53174 A | 3/2013 | |
| JP | 2014-65876 A | 4/2014 | |
| JP | 2016-180892 A | 10/2016 | |
| WO | 2014/020665 A1 | 2/2014 | |
| WO | 2019/003693 A1 | 1/2019 | |
| WO | 2019/107166 A1 | 6/2019 | |

OTHER PUBLICATIONS

English machine translation of JP 58017167A. (Year: 1983).*
English machine translation of JP 2003-336001 (Year: 2003).*
International Search Report dated Sep. 10, 2019, issued in counterpart International Application No. PCT/JP2019/024463 (2 pages).

* cited by examiner

*Primary Examiner* — John E Uselding
(74) *Attorney, Agent, or Firm* — WHDA, LLP

(57) ABSTRACT

A technical problem of the present invention is to provide a condensed polycyclic organic pigment having excellent dispersion properties and dispersion stability. More specifically, the technical problem of the present invention is to provide a condensed polycyclic organic pigment in which a practically sufficient viscosity is achieved in terms of both the initial viscosity of a base ink and the viscosity over time of a base ink when used in the printing ink application. As a result of thorough studies on the surface state of organic pigment particles and interaction among components constituting a printing ink, it has been found that the technical problem can be solved by using a polyvalent metal inorganic salt in a condensed polycyclic organic pigment, thus accomplishing the present invention.

6 Claims, No Drawings

CONDENSED POLYCYCLIC ORGANIC PIGMENT COMPOSITION CONTAINING POLYVALENT METAL INORGANIC SALT

TECHNICAL FIELD

The present invention relates to a condensed polycyclic organic pigment composition which can be used in a wide range of applications, such as printing inks, coatings, colored molded products, stationery, textile printing, toners for electrostatic image development, color filters for liquid crystal displays, inks for inkjet printing, and cosmetics.

BACKGROUND ART

In general, an organic pigment for coloring purpose is formed of fine particles. In the case where a pigment, which is formed of aggregates of fine primary particles, is dispersed in a vehicle, for example, in a printing ink for gravure printing or flexographic printing or in a coating, in order to break aggregation of particles, various ideas have been devised, such as long-time dispersion with strong force, and addition of a dispersing agent.

Above all, in the case where a condensed polycyclic organic pigment, such as a phthalocyanine pigment, a quinacridone pigment, or a perylene pigment, is used, there are marked problems related to flowability, and in order to improve flowability, combined use of a condensed polycyclic organic pigment and a derivative thereof has been studied. For example, as the derivative of a phthalocyanine pigment, a sulfonic acid derivative, a sulfonamide derivative, a dialkylaminoalkyl derivative, a phthalimide alkyl derivative, or the like is known.

However, even in such a method of breaking aggregates of pigment particles or a method in which a derivative of a pigment is used in combination, the viscosity of ink may be increased depending on intended use, or thickening of ink (an increase in viscosity) during storage may cause a decrease in flowability in some cases.

In particular, in the case where a phthalocyanine pigment, a quinacridone pigment, and a perylene pigment are used in printing inks, the viscosity of ink and viscosity stability pose problems. Thickening of ink may cause insufficient dispersion in a dispersing machine during ink production, stoppage of equipment, and a degradation in the finish of print, and this is a problem desired to be solved.

Under these circumstances, there has been proposed a method in which a phthalocyanine pigment serving as a condensed polycyclic organic pigment, a specific sulfonic acid derivative, alkali metal atoms, and a specific anion salt are used in combination (Patent Literature 1).

However, even in these methods, there have been cases where it is not possible to practically sufficiently suppress an increase in the viscosity of ink or to improve stability. More specifically, in the existing methods, in terms of any of various characteristics regarding dispersion properties required as a printing ink ((1) the initial viscosity of a base ink, (2) the viscosity over time of a base ink, and the like), a practically sufficient viscosity is not achieved. When the viscosity of a base ink is high, the viscosity of a printing ink after dilution with a solvent and varnish is also inevitably high, which adversely affects printability, and for example, fogging is likely to occur, thus, degrading the finish of print. When the viscosity of ink is decreased by dilution with a solvent and varnish in order to prevent fogging, the pigment concentration in the ink is relatively decreased, and a sufficient printing density may not be obtained in some cases. Furthermore, after production, a base ink is delivered and stored, and then is diluted with a solvent and varnish for use as described above. Therefore, when viscosity stability is low, the viscosity of the base ink increases after storage, resulting in a degradation in printability, such as unexpected fogging during printing.

CITATION LIST

Patent Literature

PTL 1: Japanese Unexamined Patent Application Publication No. 6-306301

SUMMARY OF INVENTION

Technical Problem

In view of the circumstances described above, a technical problem of the present invention is to provide a condensed polycyclic organic pigment having excellent dispersion properties and dispersion stability. More specifically, the technical problem is to provide a condensed polycyclic organic pigment in which a viscosity that gives practically sufficient printability is achieved in terms of both (1) the initial viscosity of a base ink and (2) the viscosity over time of a base ink when used in the printing ink application.

Solution to Problem

In order to find a pigment composition having the practically sufficient characteristics described above, the present inventors have performed thorough studies on the surface state of organic pigment particles and interaction among components constituting a printing ink. As a result, it has been found that the technical problem can be solved by using a polyvalent metal inorganic salt in a condensed polycyclic organic pigment, thus accomplishing the present invention.

That is, the present invention relates to:

Item 1. A pigment composition characterized by containing a condensed polycyclic organic pigment and a polyvalent metal inorganic salt.

Item 2. The pigment composition according to Item 1, in which the condensed polycyclic organic pigment is at least one selected from the group consisting of a phthalocyanine pigment, a quinacridone pigment, and a perylene pigment.

Item 3. The pigment composition according to Item 1 or 2, in which the polyvalent metal inorganic salt is at least one selected from the group consisting of iron(II) sulfate, aluminum sulfate, potassium aluminum sulfate, copper(II) sulfate, iron(II) chloride, iron(III) chloride, zinc sulfate, and magnesium sulfate.

Item 4. The pigment composition according to any one of Items 1 to 3, characterized by containing 0.1 to 5.0 parts by mass of the polyvalent metal inorganic salt per 100 parts by mass of the condensed polycyclic organic pigment.

Item 5. A method of producing the pigment composition according to any one of Items 1 to 4 containing a condensed polycyclic organic pigment and a polyvalent metal inorganic salt, the method being characterized by including mixing a polyvalent metal inorganic salt into a water slurry of a condensed polycyclic organic pigment and uniformly stirring the resulting mixture.

Item 6. A coloring agent including at least the pigment composition according to any one of Items 1 to 4.

Item 7. A printing ink including the pigment composition according to any one of Items 1 to 4 and a varnish.

Advantageous Effects of Invention

The pigment composition according to the present invention has a particularly marked advantage in that a condensed polycyclic organic pigment composition having excellent dispersion properties and dispersion stability can be obtained. More specifically, a practically sufficient viscosity can be achieved in terms of both (1) the initial viscosity of a base ink and (2) the viscosity over time of a base ink when the condensed polycyclic organic pigment composition is used in the printing ink application.

DESCRIPTION OF EMBODIMENTS

The present invention will be described in detail below.

The present invention provides a pigment composition containing a condensed polycyclic organic pigment and a polyvalent metal inorganic salt. Such a pigment composition according to the present invention has excellent dispersion properties and dispersion stability even when used as a printing ink or coating.

<Description of Condensed Polycyclic Organic Pigment>

The condensed polycyclic organic pigment used in the present invention means an organic pigment having a cyclic structure with a benzene ring or a heterocycle among organic pigments. Examples of the condensed polycyclic organic pigment used in the present invention include phthalocyanine pigments, such as C.I. Pigment Blue 15, C.I. Pigment Blue 15:1, C.I. Pigment Blue 15:2, C.I. Pigment Blue 15:3, C.I. Pigment Blue 15:4, C.I. Pigment Blue 15:5, C.I. Pigment Blue 15:6, C.I. Pigment Blue 16, C.I. Pigment Blue 17, C.I. Pigment Blue 75, C.I. Pigment Blue 79, C.I. Pigment Green 7, C.I. Pigment Green 36, C.I. Pigment Green 58, C.I. Pigment Green 59, C.I. Pigment Green 62, and C.I. Pigment Green 63; quinacridone pigments, such as C.I. Pigment Violet 19, C.I. Pigment Violet 42, C.I. Pigment Violet 55, C.I. Pigment Red 122, C.I. Pigment Red 202, C.I. Pigment Red 206, C.I. Pigment Red 207, C.I. Pigment Red 209, C.I. Pigment Orange 48, and C.I. Pigment Orange 49; perylene pigments, such as C.I. Pigment Red 123, C.I. Pigment Red 149, C.I. Pigment Red 178, C.I. Pigment Red 179, C.I. Pigment Red 190, C.I. Pigment Red 224, C.I. Pigment Violet 29, C.I. Pigment Black 31, and C.I. Pigment Black 32; perinone pigments, such as C.I. Pigment Orange 43 and C.I. Pigment Red 194; isoindolinone pigments, such as C.I. Pigment Yellow 109, C.I. Pigment Yellow 110, C.I. Pigment Yellow 173, C.I. Pigment Yellow 179, C.I. Pigment Orange 61, and C.I. Pigment Brown 38; isoindoline pigments, such as C.I. Pigment Yellow 139, C.I. Pigment Yellow 185, C.I. Pigment Orange 66, C.I. Pigment Orange 69, and C.I. Pigment Red 260; thioindigo pigments, such as C.I. Pigment Red 88, C.I. Pigment Red 181, C.I. Pigment Red 279, C.I. Pigment Violet 36, and C.I. Pigment Violet 38; anthraquinone pigments, such as C.I. Pigment Red 83, C.I. Pigment Red 89, C.I. Pigment Red 168, C.I. Pigment Red 177, C.I. Pigment Red 182, C.I. Pigment Red 216, C.I. Pigment Red 226, C.I. Pigment Red 251, C.I. Pigment Red 263, C.I. Pigment Blue 60, C.I. Pigment Yellow 24, C.I. Pigment Yellow 99, C.I. Pigment Yellow 108, C.I. Pigment Yellow 123, C.I. Pigment Yellow 199, C.I. Pigment Violet 31, C.I. Pigment Orange 40, C.I. Pigment Orange 51, C.I. Pigment Violet 5:1, and C.I. Pigment Black 20; quinophthalone pigments, such as C.I. Pigment Yellow 138 and C.I. Pigment Yellow 231; diketopyrrolopyrrole pigments, such as C.I. Pigment Orange 71, C.I. Pigment Orange 73, C.I. Pigment Orange 81, C.I. Pigment Red 254, C.I. Pigment Red 255, C.I. Pigment Red 264, C.I. Pigment Red 270, and C.I. Pigment Red 272; and metal complex pigments, such as C.I. Pigment Yellow 117, C.I. Pigment Yellow 129, C.I. Pigment Yellow 150, C.I. Pigment Yellow 153, C.I. Pigment Orange 65, C.I. Pigment Orange 68, C.I. Pigment Red 257, C.I. Pigment Red 271, C.I. Pigment Green 8, and C.I. Pigment Green 10.

As the condensed polycyclic organic pigment used in the present invention, a commercial product may be used, or a product produced by a known method may be used. Of course, after production, the product may be appropriately subjected to a known treatment before use, and for example, may be subjected to a pigment derivative treatment, surfactant treatment, resin treatment, or resin treatment before use. Furthermore, the pigment particle size, the particle shape, and the particle surface charge may be adjusted and controlled when used for printing inks, coatings, colored molded products, stationery, textile printing, toners for electrostatic image development, color filters for liquid crystal displays, inks for inkjet printing, and cosmetics. Preferably, the condensed polycyclic organic pigment has a specific surface area determined by the BET method in the range of 20 to 130 $m^2/g$.

<Description of Polyvalent Metal Inorganic Salt>

The present inventors have found that, by treating the condensed polycyclic organic pigment with a polyvalent metal inorganic salt, in a nitrocellulose (hereinafter, expressed as "NC") alcohol ink, it is possible to obtain a markedly excellent effect of suppressing an increase in viscosity in terms of both the initial viscosity and the viscosity over time of the base ink.

In general, an organic pigment ink includes a pigment, a solvent, a resin, and an additive, and the organic pigment is in a dispersed state in the ink. The pigment dispersion process in ink production includes, in detail, a step of wetting aggregates of pigment particles by a solvent, subsequently, a step of mechanically breaking the aggregates into pigment particles, and a step of stabilizing dispersion in which a resin or the like is made to adsorb on the surfaces of the pigment particles in order to prevent reaggregation. Consequently, faster wetting of the pigment by the solvent shortens the time to proceed to the subsequent step of breaking, and therefore, dispersion proceeds rapidly. Furthermore, when adsorption of the resin on the pigment particles is strong, aggregation of the pigment particles can be prevented due to the effect of steric hindrance of the resin.

Here, the surfaces of pigment particles of the condensed polycyclic organic pigment are hydrophobic unless a special treatment is performed thereon. In recent years, because of demands from the viewpoint of safety and environment, hydrophilic solvents, such as alcohol solvents, have become to be used as solvents for ink. Accordingly, since such a solvent has poor affinity with the condensed polycyclic organic pigment having hydrophobic surfaces, insufficient dispersion is likely to occur, the ink has a high viscosity even immediately after dispersion, and naturally, the viscosity of ink after storage is also high.

In many cases, a condensed polycyclic organic pigment has a molecular structure which does not have an electric charge, but there is intramolecular polarization. Therefore, negative polarization in the pigment molecule interacts with metal cations, and the organic pigment can adsorb the metal cations. In this way, the surfaces of pigment particles of the pigment composition according to the present invention are covered with metal atoms, and the hydrophilicity of particle surfaces is increased compared with non-treated pigments. Therefore, it is surmised that since wettability to the solvent increases, wetting proceeds fast, and dispersion proceeds rapidly, resulting in a decrease in the viscosity of ink, thus achieving an excellent viscosity.

Furthermore, although the nitro group of the NC resin is a neutral functional group which does not have an electric charge, electrons on the nitrogen atom are attracted by the oxygen atom, and polarization occurs in the nitro group. Accordingly, metal atoms on the pigment particles of the pigment composition according to the present invention interact with the NC resin, and the NC resin is likely to be adsorbed. Therefore, it is surmised that the effect of steric hindrance of the resin strongly acts, and the ink after storage has an excellent viscosity.

The effect by the metal cations during dispersion excels in the case of a polyvalent metal. The reason for this is surmised to be that a polyvalent metal cation has a stronger Coulomb force than a monovalent metal cation, and more strongly interacts with a hydrophilic solvent or NC resin.

As the polyvalent metal inorganic salt used in the present invention, any salt of a divalent or higher metal cation and an inorganic acid anion can be used. Examples of the metal cation include $Be^{2+}$, $Mg^{2+}$, $Ca^{2+}$, $Sr^{2+}$, $Ba^{2+}$, $Zn^{2+}$, $Al^{3+}$, $Cd^{2+}$, $Fe^{2+}$, $Fe^{3+}$, $Co^{2+}$, $Cr^{2+}$, $Cr^{3+}$, $Cr^{4+}$, $Hg^{2+}$, $Cu^{2+}$, $Pb^{2+}$, $Ni^{2+}$, and $Mn^{2+}$. Examples of the inorganic acid anion include $F^-$, $Cl^-$, $Br^-$, $I^-$, $NO_3^-$, $PO_4^{3-}$, $HPO_4^{2-}$, $H_2PO_4^-$, $SO_4^{2-}$, $HSO_4^-$, $CO_3^{2-}$, and $HCO_3^-$.

More specific examples include iron(II) sulfate, aluminum sulfate, potassium aluminum sulfate, copper(II) sulfate, iron(II) chloride, iron(III) chloride, zinc sulfate, and magnesium sulfate.

In particular, from the viewpoint that the effect of suppressing the viscosity of ink is marked, preferably, iron(II) sulfate, aluminum sulfate, potassium aluminum sulfate, and copper(II) sulfate are used.

The polyvalent metal inorganic salts used in the present invention may be used alone or optionally in combination of two or more.

<Description of Contents of Condensed Polycyclic Organic Pigment and Polyvalent Metal Inorganic Salt>

The pigment composition according to the present invention preferably contains 0.1 to 5.0 parts by mass of the polyvalent metal inorganic salt per 100 parts by mass of the condensed polycyclic organic pigment, and in particular, from the viewpoint that the effect of suppressing the viscosity of ink is marked, more preferably contains 0.3 to 3.0 parts by mass of the polyvalent metal inorganic salt.

<Method of Producing Pigment Composition Containing Condensed Polycyclic Organic Pigment and Polyvalent Metal Inorganic Salt>

Examples of a method of preparing the pigment composition according to the present invention include:

(A) A method in which a polyvalent metal inorganic salt is mixed into a pigment slurry obtained by suspending a wet cake of a condensed polycyclic organic pigment in water or like, the resulting mixture is uniformly stirred, and then filtering, drying, and pulverization are performed in a usual manner to obtain a pigment composition.

(B) A method in which before a wet cake of a condensed polycyclic organic pigment is dried, an aqueous solution of a polyvalent metal inorganic salt is sprayed onto the wet cake, and drying and pulverization are performed in a usual manner to obtain a pigment composition.

(C) A method in which a dried condensed polycyclic organic pigment and a polyvalent metal inorganic salt are dry-mixed by using a blender, such as a Nauta mixer, Henschel mixer, Airmix mixer, or kneader, without being subjected to grinding.

(D) A method in which a dried condensed polycyclic organic pigment and a polyvalent metal inorganic salt, which are separately prepared in advance, are simultaneously added when used for an ink, coating, or the like.

(E) A method in which a polyvalent metal inorganic salt is mixed into a pigment slurry obtained by suspending a wet cake of a condensed polycyclic organic pigment in water or like, the resulting mixture is uniformly stirred, and then spraying and drying are performed by using a spin flash dryer, spray dryer, or the like.

Among the methods of preparing the pigment composition described above, the preparation method (A) is preferable from the viewpoint that the condensed polycyclic organic pigment can be uniformly treated with the polyvalent metal inorganic salt and that the method can be handled within the usual condensed polycyclic organic pigment production process.

As long as the advantageous effects of the present invention are not adversely affected, the pigment composition according to the present invention may be further incorporated with an additive, a dispersing agent, and the like and can be adjusted so as to be suitable for various applications.

The pigment composition according to the present invention thus obtained can be suitably used in any application requiring a coloring function. For example, the pigment composition can be used in various commonly known applications, such as printing inks, coatings, colored molded products, stationery, textile printing, toners for electrostatic image development, color filters for liquid crystal displays, inks for inkjet printing, and cosmetics.

The pigment composition according to the present invention can provide a printing ink which is excellent in terms of initial viscosity and viscosity over time. The printing ink can be prepared by mixing, in accordance with the known preparation method, any of various binder resins, any of various solvents, any of various additives, and the like, which are known and commonly used, into the pigment composition obtained by the production method according to the present invention. Specifically, a base ink for a liquid ink having a high pigment concentration is prepared, and by using any of various binders, any of various solvents, any of various additives, and the like, a liquid link can be prepared.

The pigment composition according to the present invention can be used for producing a base ink for an NC resin-based liquid ink having excellent flowability and low viscosity, and is suitable as a pigment composition for a gravure printing ink or flexographic printing ink. A base ink for an NC resin-based liquid ink includes an NC resin, a solvent, a pigment, and various additives. By adding any of various binder resins, a solvent, any of various additives, and the like to the base ink for an NC resin-based liquid ink, a liquid ink can be produced. Examples of the binder resin that can be used include an NC resin, a polyamide resin, a polyurethane resin, and an acrylic resin. Examples of the solvent that can be used include aromatic organic solvents, such as toluene and xylene; ketone solvents, such as methyl ethyl ketone, methyl isobutyl ketone, cyclohexanone, 2-heptanone, and 3-heptanone; ester solvents, such as ethyl acetate, n-propyl acetate, isopropyl acetate, and isobutyl acetate; alcohol solvents, such as methanol, ethanol, n-propanol, isopropanol, n-butanol, isobutanol, and t-butanol; and glycol ether solvents, such as ethylene glycol monomethyl ether, ethylene glycol monoethyl ether, ethylene glycol mono-n-propyl ether, ethylene glycol mono-i-propyl ether, ethylene glycol mono-n-butyl ether, ethylene glycol mono-i-butyl ether, ethylene glycol mono-t-butyl ether, propylene glycol monomethyl ether, propylene glycol monoethyl ether, propylene glycol mono-n-propyl ether, propylene glycol mono-i-propyl ether, propylene glycol mono-n-butyl ether, propylene glycol mono-i-butyl ether, propylene glycol mono-t-butyl ether, ethylene glycol dimethyl ether, ethylene glycol diethyl ether, ethylene glycol di-n-propyl ether, ethylene glycol di-i-propyl ether, ethylene glycol di-n-butyl ether, ethylene glycol di-i-butyl ether, ethylene glycol di-t-butyl ether, propylene glycol dimethyl ether, propylene glycol diethyl ether, propylene glycol di-n-propyl ether, propylene glycol di-i-propyl ether, propylene glycol di-n-butyl ether, propylene glycol di-i-butyl ether, propylene glycol di-t-butyl ether, diethylene glycol monomethyl ether, diethylene glycol monoethyl ether, diethylene glycol mono-n-propyl ether, diethylene glycol mono-i-propyl ether, diethylene glycol mono-n-butyl ether, diethylene glycol mono-i-butyl ether, diethylene glycol mono-t-butyl ether, diethylene glycol dimethyl ether, diethylene glycol diethyl ether, diethylene glycol di-n-propyl ether, diethylene glycol di-i-propyl ether, diethylene glycol di-n-butyl ether, diethylene glycol di-i-butyl ether, diethylene glycol di-t-butyl ether, dipropylene glycol monomethyl ether, dipropylene glycol monoethyl ether, dipropylene glycol mono-n-propyl ether, dipropylene glycol mono-i-propyl ether, dipropylene glycol mono-n-butyl ether, dipropylene glycol mono-i-butyl ether, dipropylene glycol mono-t-butyl ether, dipropylene glycol dimethyl ether, dipropylene glycol diethyl ether, dipropylene glycol di-n-propyl ether, dipropylene glycol di-i-propyl ether, dipropylene glycol di-n-butyl ether, dipropylene glycol di-i-butyl ether, dipropylene glycol di-t-butyl ether, ethylene glycol monomethyl ether acetate, ethylene glycol monoethyl ether acetate, propylene glycol monomethyl ether acetate, propylene glycol monoethyl ether acetate, diethylene glycol monomethyl ether acetate, and diethylene glycol monoethyl ether acetate.

In the case where the pigment composition according to the present invention is used in a printing ink, a printing ink including the pigment composition according to the present invention prepared as described above can be used after being diluted with ethyl acetate, a polyurethane varnish, or a polyamide varnish. A known and commonly used method can be employed to prepare a printing ink.

In the case where a coating is produced by using, as a coloring agent, the pigment composition according to the present invention, examples of the resin used as the coating include various resins, such as an acrylic resin, a melamine resin, an epoxy resin, a polyester resin, a polyurethane resin, a polyamide resin, and a phenolic resin.

Examples of the solvent used in a coating include aromatic solvents, such as toluene, xylene, and methoxybenzene; acetate solvents, such as ethyl acetate, butyl acetate, propylene glycol monomethyl ether acetate, and propylene glycol monoethyl ether acetate; propionate solvents, such as ethoxyethyl propionate; alcohol solvents, such as methanol, ethanol, propanol, n-butanol, and isobutanol; ether solvents, such as butyl cellosolve, propylene glycol monomethyl ether, diethylene glycol ethyl ether, and diethylene glycol dimethyl ether; ketone solvents, such as methyl ethyl ketone, methyl isobutyl ketone, and cyclohexanone; aliphatic hydrocarbon solvents, such as hexane; nitrogen compound solvents, such as N,N-dimethylformamide, γ-butyrolactam, N-methyl-2-pyrrolidone, aniline, and pyridine; lactone solvents, such as γ-butyrolactone; carbamate solvents, such as a 48:52 mixture of methyl carbamate and ethyl carbamate; and water. As the solvent, in particular, a water-soluble polar solvent, such as a propionate solvent, an alcohol solvent, an ether solvent, a ketone solvent, a nitrogen compound solvent, a lactone solvent, or water, is suitable.

Furthermore, in the case where the pigment composition is dispersed or mixed in a liquid resin to obtain a resin composition for coating, usual additives, such as dispersing agents, fillers, auxiliary materials for coating, desiccants, plasticizers and/or auxiliary pigments, can be used. All of the components are collected individually or in groups, or all of them are added at once, and dispersion or mixing is performed.

Examples of a dispersing machine used for dispersing the pigment composition include, but are not limited thereto, known dispersing machines, such as a Disper, a homomixer, a paint conditioner, a Scandex, a bead mill, an attritor, a ball mill, a two-roll mill, a three-roll mill, and a pressure kneader. The pigment composition according to the present invention is dispersed after adding a resin and a solvent thereto so as to obtain a viscosity that enables dispersion. A high-concentration coating base after dispersion has a solid content of 5 to 20%, and a resin and a solvent are further mixed thereto to provide a coating for use.

EXAMPLES

The present invention will be described in more detail below with reference to Examples, Comparative Examples, and Reference Examples. In the following Examples, Comparative Examples, and Reference Examples, unless otherwise noted, "%" denotes "% by mass".

In the examples, metal contents in pigment compositions were measured by X-ray fluorescence analysis.

The details are as follows.

Contents of Fe, Cu, and Zn: measured with an X-ray fluorescence spectrometer Epsilon 5 (manufactured by PANalytical B.V). By using about 1,000 mg of the resulting pigment powder, a sample tablet with a diameter of 19 mm was formed and used for measurement.

Contents of Al, Mg, and Na: measured with an X-ray fluorescence spectrometer ZSX100e (manufactured by Rigaku Corporation). By using about 200 mg of the resulting pigment powder, a sample tablet with a diameter of 13 mm was formed and used for measurement.

Regarding the measurement of the specific surface area of the pigment by the BET method, by using about 100 mg of pigment powder, measurement was performed with a specific surface area analyzer Macsorb HM model-1220 (manufactured by MOUNTECH Co., Ltd).

Reference Example 1

Water was added to a wet cake (pigment content 60 parts) of C.I. Pigment Violet 23 (manufactured by DIC Corporation; specific surface area determined by the BET method: 75 m$^2$/g) to make the total volume 1,000 parts, and deflocculation was performed, in a stainless steel cup, using a Homogenizing Disper Model 2.5 (manufactured by PRIMIX Corporation) for 30 minutes. 1.8 Parts of iron(II) sulfate heptahydrate (manufactured by Wako Pure Chemical Industries, Ltd.) was added thereto, and stirring was performed for one hour. The resulting slurry was subjected to Nutsche filtration, and a filter cake was dried by blowing (98° C., 18 hours) and pulverized to obtain 60 parts of a violet 23 pigment composition (A-1). The Fe content in the pigment composition was 2,470 ppm. This was 1.2 parts per 100 parts of C.I. Pigment Violet 23 when converted to the amount of iron(II) sulfate heptahydrate.

Reference Example 2

The same operation as that of [Reference Example 1] was performed except that the amount of iron(II) sulfate heptahydrate added was changed to 3.6 parts, and 60 parts of a violet 23 pigment composition (A-2) was obtained. The Fe content in the pigment composition was 3,480 ppm. This was 1.7 parts per 100 parts of C.I. Pigment Violet 23 when converted to the amount of iron(II) sulfate heptahydrate.

Reference Example 3

The same operation as that of [Reference Example 1] was performed except that the amount of iron(II) sulfate heptahydrate added was changed to 5.4 parts, and 60 parts of a violet 23 pigment composition (A-3) was obtained. The Fe content in the pigment composition was 4,190 ppm. This was 2.1 parts per 100 parts of C.I. Pigment Violet 23 when converted to the amount of iron(II) sulfate heptahydrate.

Reference Example 4

The same operation as that of [Reference Example 1] was performed except that the amount of iron(II) sulfate heptahydrate added was changed to 7.2 parts, and 60 parts of a violet 23 pigment composition (A-4) was obtained. The Fe content in the pigment composition was 4,760 ppm. This was 2.4 parts per 100 parts of C.I. Pigment Violet 23 when converted to the amount of iron(II) sulfate heptahydrate.

Reference Example 5

The same operation as that of [Reference Example 1] was performed except that iron(II) sulfate heptahydrate was changed to 3.6 parts of aluminum sulfate 14-18 hydrate (manufactured by Wako Pure Chemical Industries, Ltd.), and 60 parts of a violet 23 pigment composition (A-5) was obtained. The Al content in the pigment composition was 484 ppm. This was 0.6 parts per 100 parts of C.I. Pigment Violet 23 when converted to the amount of aluminum sulfate 16-hydrate.

Reference Example 6

The same operation as that of [Reference Example 1] was performed except that iron(II) sulfate heptahydrate was changed to 5.4 parts of aluminum sulfate 14-18 hydrate (manufactured by Wako Pure Chemical Industries, Ltd.), and 60 parts of a violet 23 pigment composition (A-6) was obtained. The Al content in the pigment composition was 750 ppm. This was 0.9 parts per 100 parts of C.I. Pigment Violet 23 when converted to the amount of aluminum sulfate 16-hydrate.

Reference Example 7

The same operation as that of [Reference Example 1] was performed except that iron(II) sulfate heptahydrate was changed to 5.4 parts of potassium aluminum sulfate (manufactured by Wako Pure Chemical Industries, Ltd.), and 60 parts of a violet 23 pigment composition (A-7) was obtained. The Al content in the pigment composition was 981 ppm. This was 1.7 parts per 100 parts of C.I. Pigment Violet 23 when converted to the amount of potassium aluminum sulfate.

Reference Example 8

The same operation as that of [Reference Example 1] was performed except that iron(II) sulfate heptahydrate was changed to 3.6 parts of copper(II) sulfate (manufactured by Wako Pure Chemical Industries, Ltd.), and 60 parts of a violet 23 pigment composition (A-8) was obtained. The Cu content in the pigment composition was 5,713 ppm. This was 1.4 parts per 100 parts of C.I. Pigment Violet 23 when converted to the amount of copper(II) sulfate.

Reference Example 9

The same operation as that of [Reference Example 1] was performed except that iron(II) sulfate heptahydrate was changed to 3.6 parts of zinc sulfate heptahydrate (manufactured by Wako Pure Chemical Industries, Ltd.), and 60 parts of a violet 23 pigment composition (A-9) was obtained. The Zn content in the pigment composition was 5,923 ppm. This was 2.6 parts per 100 parts of C.I. Pigment Violet 23 when converted to the amount of zinc sulfate heptahydrate.

Reference Example 10

The same operation as that of [Reference Example 1] was performed except that iron(II) sulfate heptahydrate was changed to 3.6 parts of magnesium sulfate (manufactured by Wako Pure Chemical Industries, Ltd.), and 60 parts of a violet 23 pigment composition (A-10) was obtained. The Mg content in the pigment composition was 2,298 ppm. This was 1.1 parts per 100 parts of C.I. Pigment Violet 23 when converted to the amount of magnesium sulfate.

Reference Example 11

The same operation as that of [Reference Example 1] was performed except that iron(II) sulfate heptahydrate was changed to 4.0 parts of iron(II) chloride (manufactured by Wako Pure Chemical Industries, Ltd.), and 60 parts of a violet 23 pigment composition (A-11) was obtained. The Fe content in the pigment composition was 6,359 ppm. This was 1.4 parts per 100 parts of C.I. Pigment Violet 23 when converted to the amount of iron(II) chloride.

Reference Example 12

The same operation as that of [Reference Example 1] was performed except that iron(II) sulfate heptahydrate was changed to 5.4 parts of iron(III) chloride (manufactured by Wako Pure Chemical Industries, Ltd.), and 60 parts of a violet 23 pigment composition (A-12) was obtained. The Fe content in the pigment composition was 6,892 ppm. This was 2.0 parts per 100 parts of C.I. Pigment Violet 23 when converted to the amount of iron(III) chloride.

Reference Example 13

0.9 Parts of iron(II) sulfate heptahydrate was mixed into dried C.I. Pigment Violet 23, followed by pulverization to obtain 60 parts of a violet 23 pigment composition (A-13). The Fe content in the pigment composition was 2,941 ppm.

This was 1.5 parts per 100 parts of C.I. Pigment Violet 23 when converted to the amount of iron(II) sulfate heptahydrate.

Reference Example 14

A wet cake (pigment content 60 parts) of C.I. Pigment Violet 23 (manufactured by DIC Corporation; specific surface area determined by the BET method: 75 $m^2/g$) was dried by blowing (98° C., 18 hours) and pulverized to obtain 60 parts of a comparative violet 23 pigment composition (A'-1).

Reference Example 15

The same operation as that of [Reference Example 1] was performed except that iron(II) sulfate heptahydrate was changed to 5.4 parts of sodium sulfate (manufactured by Wako Pure Chemical Industries, Ltd.), and 60 parts of a comparative violet 23 pigment composition (A'-2) was obtained. The Na content in the pigment composition was 3,220 ppm. This was 1.0 part per 100 parts of C.I. Pigment Violet 23 when converted to the amount of sodium sulfate.

Example 1

Water was added to a wet cake (pigment content 60 parts) of C.I. Pigment Red 122 (manufactured by DIC Corporation; specific surface area determined by the BET method: 70 $m^2/g$) to make the total volume 1,000 parts, and deflocculation was performed, in a stainless steel cup, using a Homogenizing Disper Model 2.5 (manufactured by PRIMIX Corporation) for 30 minutes. 1.8 Parts of iron(II) sulfate heptahydrate (manufactured by Wako Pure Chemical Industries, Ltd.) was added thereto, and stirring was performed for one hour. The resulting slurry was subjected to Nutsche filtration, and a filter cake was dried by blowing (98° C., 18 hours) and pulverized to obtain 60 parts of a red 122 pigment composition (B-1). The Fe content in the pigment composition was 2,090 ppm. This was 1.0 part per 100 parts of C.I. Pigment Red 122 when converted to the amount of iron(II) sulfate heptahydrate.

Example 2

The same operation as that of [Example 1] was performed except that the amount of iron(II) sulfate heptahydrate added was changed to 3.6 parts, and 60 parts of a red 122 pigment composition (B-2) was obtained. The Fe content in the pigment composition was 3,500 ppm. This was 1.7 parts per 100 parts of C.I. Pigment Red 122 when converted to the amount of iron(II) sulfate heptahydrate.

Example 3

The same operation as that of [Example 1] was performed except that the amount of iron(II) sulfate heptahydrate added was changed to 5.4 parts, and 60 parts of a red 122 pigment composition (B-3) was obtained. The Fe content in the pigment composition was 4,470 ppm. This was 2.2 parts per 100 parts of C.I. Pigment Red 122 when converted to the amount of iron(II) sulfate heptahydrate.

Example 4

The same operation as that of [Example 1] was performed except that iron(II) sulfate heptahydrate was changed to 1.8 parts of aluminum sulfate 14-18 hydrate (manufactured by Wako Pure Chemical Industries, Ltd.), and 60 parts of a red 122 pigment composition (B-4) was obtained. The Al content in the pigment composition was 433 ppm. This was 0.5 parts per 100 parts of C.I. Pigment Red 122 when converted to the amount of aluminum sulfate 16-hydrate.

Example 5

The same operation as that of [Example 1] was performed except that iron(II) sulfate heptahydrate was changed to 3.6 parts of aluminum sulfate 14-18 hydrate (manufactured by Wako Pure Chemical Industries, Ltd.), and 60 parts of a red 122 pigment composition (B-5) was obtained. The Al content in the pigment composition was 486 ppm. This was 0.6 parts per 100 parts of C.I. Pigment Red 122 when converted to the amount of aluminum sulfate 16-hydrate.

Example 6

The same operation as that of [Example 1] was performed except that iron(II) sulfate heptahydrate was changed to 5.4 parts of aluminum sulfate 14-18 hydrate (manufactured by Wako Pure Chemical Industries, Ltd.), and 60 parts of a red 122 pigment composition (B-6) was obtained. The Al content in the pigment composition was 740 ppm. This was 0.9 parts per 100 parts of C.I. Pigment Red 122 when converted to the amount of aluminum sulfate 16-hydrate.

Comparative Example 1

A wet cake (pigment content 60 parts) of C.I. Pigment Red 122 (manufactured by DIC Corporation; specific surface area determined by the BET method: 70 $m^2/g$) was dried by blowing (98° C., 18 hours) and pulverized to obtain 60 parts of a comparative red 122 pigment composition (B'-1).

Comparative Example 2

The same operation as that of [Example 1] was performed except that iron(II) sulfate heptahydrate was changed to 5.4 parts of sodium sulfate (manufactured by Wako Pure Chemical Industries, Ltd.), and 60 parts of a comparative red 122 pigment composition (B'-2) was obtained. The Na content in the pigment composition was 2,880 ppm. This was 0.9 parts per 100 parts of C.I. Pigment Red 122 when converted to the amount of sodium sulfate.

Example 7

Water was added to a wet cake (pigment content 60 parts) of a solid solution of C.I. Pigment Red 122/Violet 19 (manufactured by DIC Corporation; specific surface area determined by the BET method: 80 $m^2/g$) to make the total volume 1,000 parts, and deflocculation was performed, in a stainless steel cup, using a Homogenizing Disper Model 2.5 (manufactured by PRIMIX Corporation) for 30 minutes. 1.8 Parts of iron(II) sulfate heptahydrate (manufactured by Wako Pure Chemical Industries, Ltd.) was added thereto, and stirring was performed for one hour. The resulting slurry was subjected to Nutsche filtration, and a filter cake was dried by blowing (98° C., 18 hours) and pulverized to obtain 60 parts of a red 122/violet 19 pigment composition (C-1). The Fe content in the pigment composition was 2,070 ppm.

This was 1.0 part per 100 parts of the solid solution of C.I. Pigment Red 122/Violet 19 when converted to the amount of iron(II) sulfate heptahydrate.

Example 8

The same operation as that of [Example 7] was performed except that the amount of iron(II) sulfate heptahydrate added was changed to 3.6 parts, and 60 parts of a red 122/violet 19 pigment composition (C-2) was obtained. The Fe content in the pigment composition was 2,990 ppm. This was 1.5 parts per 100 parts of the solid solution of C.I. Pigment Red 122/Violet 19 when converted to the amount of iron(II) sulfate heptahydrate.

Example 9

The same operation as that of [Example 7] was performed except that the amount of iron(II) sulfate heptahydrate added was changed to 5.4 parts, and 60 parts of a red 122/violet 19 pigment composition (C-3) was obtained. The Fe content in the pigment composition was 4,050 ppm. This was 2.0 parts per 100 parts of the solid solution of C.I. Pigment Red 122/Violet 19 when converted to the amount of iron(II) sulfate heptahydrate.

Example 10

The same operation as that of [Example 7] was performed except that iron(II) sulfate heptahydrate was changed to 1.8 parts of aluminum sulfate 14-18 hydrate (manufactured by Wako Pure Chemical Industries, Ltd.), and 60 parts of a red 122/violet 19 pigment composition (C-4) was obtained. The Al content in the pigment composition was 415 ppm. This was 0.5 parts per 100 parts of the solid solution of C.I. Pigment Red 122/Violet 19 when converted to the amount of aluminum sulfate 16-hydrate.

Example 11

The same operation as that of [Example 7] was performed except that iron(II) sulfate heptahydrate was changed to 3.6 parts of aluminum sulfate 14-18 hydrate (manufactured by Wako Pure Chemical Industries, Ltd.), and 60 parts of a red 122/violet 19 pigment composition (C-5) was obtained. The Al content in the pigment composition was 512 ppm. This was 0.6 parts per 100 parts of the solid solution of C.I. Pigment Red 122/Violet 19 when converted to the amount of aluminum sulfate 16-hydrate.

Example 12

The same operation as that of [Example 7] was performed except that iron(II) sulfate heptahydrate was changed to 5.4 parts of aluminum sulfate 14-18 hydrate (manufactured by Wako Pure Chemical Industries, Ltd.), and 60 parts of a red 122/violet 19 pigment composition (C-6) was obtained. The Al content in the pigment composition was 770 ppm. This was 0.9 parts per 100 parts of the solid solution of C.I. Pigment Red 122/Violet 19 when converted to the amount of aluminum sulfate 16-hydrate.

Comparative Example 3

A wet cake (pigment content 60 parts) of a solid solution of C.I. Pigment Red 122/Violet 19 (manufactured by DIC Corporation; specific surface area determined by the BET method: 80 m$^2$/g) was dried by blowing (98° C., 18 hours) and pulverized to obtain 60 parts of a comparative red 122/violet 19 pigment composition (C'-1).

Comparative Example 4

The same operation as that of [Example 7] was performed except that iron(II) sulfate heptahydrate was changed to 5.4 parts of sodium sulfate (manufactured by Wako Pure Chemical Industries, Ltd.), and 60 parts of a comparative red 122/violet 19 pigment composition (C'-2) was obtained. The Na content in the pigment composition was 3,150 ppm. This was 1.0 part per 100 parts of the solid solution of C.I. Pigment Red 122/Violet 19 when converted to the amount of sodium sulfate.

Example 13

Water was added to a wet cake (pigment content 60 parts) of C.I. Pigment Blue 15:3 (manufactured by DIC Corporation; specific surface area determined by the BET method: 70 m$^2$/g) to make the total volume 1,000 parts, and deflocculation was performed, in a stainless steel cup, using a Homogenizing Disper Model 2.5 (manufactured by PRIMIX Corporation) for 30 minutes. 3.6 Parts of iron(II) sulfate heptahydrate (manufactured by Wako Pure Chemical Industries, Ltd.) was added thereto, and stirring was performed for one hour. The resulting slurry was subjected to Nutsche filtration, and a filter cake was dried by blowing (98° C., 18 hours) and pulverized to obtain 60 parts of a blue 15:3 pigment composition (D-1). The Fe content in the pigment composition was 3,750 ppm. This was 1.9 parts per 100 parts of C.I. Pigment Blue 15:3 when converted to the amount of iron(II) sulfate heptahydrate.

Comparative Example 5

A wet cake (pigment content 60 parts) of C.I. Pigment blue 15:3 (manufactured by DIC Corporation; specific surface area determined by the BET method: 70 m$^2$/g) was dried by blowing (98° C., 18 hours) and pulverized to obtain 60 parts of a comparative blue 15:3 pigment composition (D'-1).

Comparative Example 6

The same operation as that of [Example 13] was performed except that iron(II) sulfate heptahydrate was changed to 5.4 parts of sodium sulfate (manufactured by Wako Pure Chemical Industries, Ltd.), and 60 parts of a comparative blue 15:3 pigment composition (D'-2) was obtained. The Na content in the pigment composition was 3,470 ppm. This was 1.1 parts per 100 parts of C.I. Pigment Blue 15:3 when converted to the amount of sodium sulfate.

Example 14

Water was added to a wet cake (pigment content 60 parts) of C.I. Pigment Red 224 (manufactured by Sun Chemical Corporation; specific surface area determined by the BET method: 30 m$^2$/g) to make the total volume 1,000 parts, and deflocculation was performed, in a stainless steel cup, using a Homogenizing Disper Model 2.5 (manufactured by PRIMIX Corporation) for 30 minutes. 3.6 Parts of iron(II) sulfate heptahydrate (manufactured by Wako Pure Chemical Industries, Ltd.) was added thereto, and stirring was performed for one hour. The resulting slurry was subjected to Nutsche filtration, and a filter cake was dried by blowing (98° C., 18 hours) and pulverized to obtain 60 parts of a red 224 pigment composition (E-1). The Fe content in the pigment composition was 3,330 ppm. This was 1.7 parts per 100 parts of C.I. Pigment Red 224 when converted to the amount of iron(II) sulfate heptahydrate.

Comparative Example 7

A wet cake (pigment content 60 parts) of C.I. Pigment Red 224 (manufactured by DIC Corporation; specific surface area determined by the BET method: 30 m²/g) was dried by blowing (98° C., 18 hours) and pulverized to obtain 60 parts of a comparative red 224 pigment composition (E'-1).

[Preparation of Various Inks]

(Preparation of NC Ethanol Varnish)

250 Parts of an NC resin (nitrogen content: 10.7 to 12.2, non-volatile matter 70%, volatile matter: ethanol), 436.5 parts of ethanol (manufactured by Wako Pure Chemical Industries, Ltd.), and 13.5 parts of ethyl acetate (manufactured by Wako Pure Chemical Industries, Ltd.) were placed in a 1-L plastic bottle, and dispersion was performed for two hours with a paint shaker (manufactured by Toyo Seiki Seisaku-sho, Ltd.) to obtain an NC ethanol varnish.

(Production of NC Ethanol Base Ink)

Regarding each of the pigment compositions obtained in Examples 1 to 14, Comparative Examples 1 to 7, and Reference Examples 1 to 15, 22 parts of the pigment composition, 40 parts of the NC ethanol varnish, 36.9 parts of ethanol (manufactured by Wako Pure Chemical Industries, Ltd.), 1.1 parts of ethyl acetate (manufactured by Wako Pure Chemical Industries, Ltd.), and 150 parts of SAZ beads (zirconia YTZ balls 1.25φ, manufactured by Tokyo Garasu Kikai Co., Ltd.) were placed in a 200-mL glass bottle, and dispersion was performed for two hours with a Shaker Skandex SK550 (manufactured by Fast & Fluid Management B. V. Company) to obtain an NC ethanol base ink.

[Measurement Results of Viscosity of Each Ink]

(Initial Viscosity of Base Ink)

The resulting NC ethanol base ink was left to stand in a constant temperature oven at 20° C. for one hour or more, and the initial viscosity of the base ink was measured with a model R85 viscometer RB85L (manufactured by Toki Sangyo Co., Ltd.) at a viscometer rotation speed of 6 rpm. A lower viscosity is better.

(Viscosity Over Time of Base Ink)

The resulting NC ethanol base ink was left to stand at room temperature for 24 hours, then left to stand in a constant temperature oven at 20° C. for one hour or more, and the viscosity was measured with a model R85 viscometer RB85L (manufactured by Toki Sangyo Co., Ltd.) at a viscometer rotation speed of 6 rpm. A lower viscosity is better.

Evaluation results of the initial viscosity of the base ink and the viscosity over time of the base ink are shown in Tables 1 to 5.

[Measurement Results of Viscosity of Violet 23 Pigment Composition NC Ethanol Base Ink]

TABLE 1

|  | Violet 23 pigment composition | Initial viscosity of base ink | Viscosity over time of base ink |
| --- | --- | --- | --- |
| Reference Example 1 | A-1 | 270 | 410 |
| Reference Example 2 | A-2 | 275 | 440 |
| Reference Example 3 | A-3 | 295 | 635 |
| Reference Example 4 | A-4 | 435 | 1600 |
| Reference Example 5 | A-5 | 220 | 330 |
| Reference Example 6 | A-6 | 225 | 395 |
| Reference Example 7 | A-7 | 240 | 475 |
| Reference Example 8 | A-8 | 215 | 325 |
| Reference Example 9 | A-9 | 445 | 5040 |
| Reference Example 10 | A-10 | 435 | 2580 |
| Reference Example 11 | A-11 | 370 | 2180 |
| Reference Example 12 | A-12 | 495 | 7400 |
| Reference Example 13 | A-13 | 315 | 760 |
| Reference Example 14 | A'-1 | 640 | 12300 |
| Reference Example 15 | A'-2 | 625 | 11300 |

[Measurement Results of Viscosity of Red 122 Pigment Composition NC Ethanol Base Ink]

TABLE 2

|  | Red 122 pigment composition | Initial viscosity of base ink | Viscosity over time of base ink |
| --- | --- | --- | --- |
| Example 1 | B-1 | 1640 | 15900 |
| Example 2 | B-2 | 1440 | 12100 |
| Example 3 | B-3 | 1500 | 13400 |
| Example 4 | B-4 | 1240 | 12400 |
| Example 5 | B-5 | 1160 | 11900 |
| Example 6 | B-6 | 1160 | 13600 |
| Comparative Example 1 | B'-1 | 25200 | 28500 |
| Comparative Example 2 | B'-2 | 23800 | 27000 |

[Measurement Results of Viscosity of Red 122/Violet 19 Pigment Composition NC Ethanol Base Ink]

TABLE 3

|  | Red 122/ violet 19 pigment composition | Initial viscosity of base ink | Viscosity over time of base ink |
| --- | --- | --- | --- |
| Example 7 | C-1 | 1040 | 8840 |
| Example 8 | C-2 | 760 | 8520 |
| Example 9 | C-3 | 1200 | 8480 |
| Example 10 | C-4 | 820 | 16200 |
| Example 11 | C-5 | 695 | 6980 |
| Example 12 | C-6 | 760 | 7000 |
| Comparative Example 3 | C'-1 | 54800 | 40300 |
| Comparative Example 4 | C'-2 | 46700 | 41500 |

[Measurement Results of Viscosity of Blue 15:3 Pigment Composition NC Ethanol Base Ink]

TABLE 4

|  | Blue 15:3 pigment composition | Initial viscosity of base ink | Viscosity over time of base ink |
| --- | --- | --- | --- |
| Example 13 | D-1 | 7880 | 12700 |
| Comparative Example 5 | D'-1 | 49800 | 32700 |
| Comparative Example 6 | D'-2 | 45100 | 35200 |

[Measurement Results of Viscosity of Red 224 Pigment Composition NC Ethanol Base Ink]

TABLE 5

|  | Red 224 pigment composition | Initial viscosity of base ink | Viscosity over time of base ink |
|---|---|---|---|
| Example 14 | E-1 | 3200 | 3880 |
| Comparative Example 7 | E'-1 | 10100 | 24300 |

The invention claimed is:

1. A pigment composition, comprising:
 a solid solution of C.I. Pigment Red 122/Violet 19 as a condensed polycyclic organic pigment; and
 a polyvalent metal inorganic salt selected from the group consisting of iron(II) sulfate, aluminum sulfate, potassium aluminum sulfate, copper(II) sulfate, iron(II) chloride, iron(III) chloride, zinc sulfate, and magnesium sulfate,
 wherein the pigment composition includes 0.1 to 3.0 parts by mass of the polyvalent metal inorganic salt per 100 parts by mass of the condensed polycyclic organic pigment.

2. A method of producing the pigment composition according to claim 1, the method being characterized by comprising mixing the polyvalent metal inorganic salt into a water slurry of the condensed polycyclic organic pigment and uniformly stirring a resulting mixture.

3. A coloring agent comprising at least the pigment composition according to claim 1.

4. A printing ink comprising the pigment composition according to claim 1 and a varnish.

5. The pigment composition according to claim 1, wherein the polyvalent metal inorganic salt is selected from the group consisting of iron(II) sulfate, aluminum sulfate, potassium aluminum sulfate, copper(II) sulfate, iron(II) chloride, zinc sulfate, and magnesium sulfate.

6. The pigment composition according to claim 1, wherein the pigment composition is for printing inks, coatings, colored molded products, stationery, textile printing, toners for electrostatic image development, color filters for liquid crystal displays, inks for inkjet printing, and cosmetics.

* * * * *